United States Patent [19]
Vroom

[11] 3,843,023
[45] Oct. 22, 1974

[54] MIXING AND DISPENSING APPARATUS HAVING NOZZEL CLEANER

[76] Inventor: David H. Vroom, 4550 N. Flowing Wells Rd., Lot 225, Tucson, Ariz. 85705

[22] Filed: Sept. 17, 1973

[21] Appl. No.: 398,000

[52] U.S. Cl.................. 222/136, 141/90, 222/149, 222/214, 222/504
[51] Int. Cl.............................................. B67d 5/54
[58] Field of Search..... 222/135, 136, 145, 146 HE, 222/149, 477, 504, 518, 523, 525, 559, 571; 141/90; 137/244

[56] References Cited
UNITED STATES PATENTS
2,627,818  2/1953  Davis............................. 137/244 X
2,721,008  10/1955  Morgan, Jr. .................... 222/571 X Primary Examiner—Robert B. Reeves
Assistant Examiner—David A. Scherbel

[57] ABSTRACT

This invention is a mixing and dispensing apparatus having a filler housing means operably connected to a hardener housing means through a material control means so as to dispense and mix a filler material and a hardening material therefrom. More particularly, this invention is a mixing and dispensing apparatus operable under fluid pressure in order to separately dispense controlled quanities of filler and hardener materials into a rotating mixing chamber before dispensing and having means in order to be self-cleansing when moved to the de-activated condition to prevent hardening and resultant contamination of the mixing chamber.

12 Claims, 9 Drawing Figures

MIXING AND DISPENSING APPARATUS HAVING NOZZEL CLEANER

Numerous types of mixing devices are known to the prior art in order to mix and subsequently dispense materials therefrom. However, none of the prior art devices are satisfactory for use with an epoxy type mixture combining a filler and a hardening material as a failure to properly cleanse the mixed material from the dispensing apparatus will result in a hardening thereof thus rendering the mixing apparatus inoperable. Additionally, none of the prior art devices provide means which are automatically operable to cleanse the mixing and dispensing area of the mechanism so that the system is continuously or periodically usable without fear of contamination.

In one preferred embodiment of this invention, a mixing and dispensing apparatus is provided including a filler or first housing means connected through a material control means to a hardener or second housing means. The filler housing means includes a filler housing member integral with a discharge throat for dispensing material therefrom and a fluid flow housing connected to the filler housing member. The filler housing member includes a main body having a lid member mounted thereon in a sealing fashion to receive the filler material therein. The discharge throat is of a tubular shape to receive and dispense filler material from the main body towards the material control means. The fluid flow housing is provided with a flow channel therein to receive fluid pressure to force the filler material out the discharge throat during operation. The material control means includes a main control housing having therein an actuator control means secured to the filler housing means; a motor means operably connected to the actuator control means; a mixer and wiper means operably connected to the motor means; and a cleanser assembly connected to the mixer and wiper means. The control housing includes a cylindrical main body integral with a lower dispensing nozzle assembly. The nozzle assembly is of a tapered shape having a central bore therethrough to form a mixing chamber. The actuator control means includes a plunger assembly mounted within a plunger housing in order to direct fluid flow therefrom through first and second fluid flow channels. The plunger assembly includes a plunger button which is operable to be moved axially so as to selectively direct fluid flow through the first and second fluid flow channels. The motor means includes an air rotor assembly connected to the second fluid flow channel; a bearing assembly having the air rotor assembly connected thereto; and a gear assembly connected to the air rotor assembly. The air rotor assembly includes blade members secured to a central driven shaft. The bearing assembly includes bearing members to receive the central driven shaft therein with the bearing members carried in mount members which, in turn, are secured to the control housing. The gear assembly includes an outer gear having internal teeth engagable with a pair of planetary gears that are engaged with a central gear secured to the central driven shaft. The central gear rotates to drive the planetary gears which, in turn, are connected to the mixer and wiper means for driving the same. The mixer and wiper means includes a mixer assembly connected to the motor means and a wiper assembly mounted about the mixer assembly. The mixer assembly includes a main elongated mixer shaft having its upper end mounted within a support bearing member and an outer mixer blade secured to the lower end of the mixer shaft as by a screw member. The wiper assembly includes a main wiper member mounted about the mixer blade and having an upper portion adjacent to the support bearing member and operably connected to the first fluid flow channel. The wiper member includes a first enlarged head section integrally connected to a shaft section. The shaft section has an inner contour conforming to that of the periphery of the mixer blade. The wiper member is movable longitudinally under fluid pressure about the mixer blade in the central bore of the nozzle assembly for cleansing purposes. The mixing chamber is provided with a first enlarged opening connected to the discharge throat of the filler housing to receive material therethrough for mixing purposes. Across from the first opening is a smaller inlet opening to receive hardener material therethrough to the mixing chamber. The cleanser assembly includes a cleanser housing having a needle assembly and a biasing means mounted therein. The cleanser housing includes a main body having a closure cap thereon. The main body has an inlet section to receive the hardener housing thereon and provided with a central elongated stepped opening connected to the inlet opening to the mixing chamber. The needle assembly is provided with a central body having a needle section and guide section integral therewith. The needle section is operable to open and close the inlet opening to the mixing chamber and can be regulated by the biasing means to control size of the inlet opening and amount of hardener material being discharged. The hardener housing member is integral with the control housing and provided with a fluid flow channel therefrom into the control housing to receive air pressure from the second fluid flow channel and the actuator control means. The upper end of the hardener housing member is provided with male threads thereon to receive the closure housing connected thereabout to seal the area therewithin. The sealing is required as the air pressure is utilized in order to force the hardener material therefrom through the cleanser assembly into the mixing chamber.

In another embodiment of this invention, a mixing and dispensing apparatus is provided including the filler housing means connected through a material control means to a second housing means. The material control means is substantially as previously described except the wiper means includes a wiper assembly mounted in a fluid control sleeve assembly. The wiper assembly includes the main wiper blade connected to a control head slidably mounted within the fluid control sleeve. The cylindrical fluid control sleeve is movable axially under fluid pressure to align certain fluid flow paths to control rotation of the air motor until after axial movement of the wiper blade for greater fluid efficiency.

One object of this invention is to provide a mixing and dispensing apparatus operable under fluid pressure to mix first and second materials in a mixing chamber and dispense in a desired amount and having means therewith for automatically cleansing the mixing area after each usage.

Another object of this invention is to provide a mixing and dispensing apparatus operable to mix a hardener and a filler material to achieve an epoxy mixture and having means therewith for automatically and completely cleansing the mixing chamber after each mixing operation.

Another object of this invention is to provide a mixing and dispensing apparatus having a filler housing means with filler material therewithin; a hardener housing means having hardener material therewithin; and a material control means operably connecting the filler housing means and the hardener housing means to receive the filler material and hardener material therewithin for mixing purposes and automatically dispensing the mixed material therefrom.

Still, one other object of this invention is to provide a mixing and dispensing apparatus constructed of plastic materials having a control means operable to dispense a desired amount of mixture of hardener and filler materials while achieving the thorough mixing prior to the dispensing thereof and having means for cleansing the mixing area in an efficient and effective manner.

One other object of this invention is to provide a mixing and dispensing apparatus operable to provide retracted movement of the wiper blade prior to initial starting of the mixing motor, and conversely, on ceasing the dispensing operation, the mixing motor is stopped prior to extension of the wiper blade.

Still, another object of this invention is to provide a mixing and dispensing apparatus which is operable to mix and dispense an epoxy material; economical to manufacture; simple and accurate in usage; providing a thorough mixing thereof; and substantially maintenance free.

Various other objects, advantages, and features of the invention will become apparent to those skilled in the art from the following discussion, taken in conjunction with the accompanying drawings, in which.

Figure 1:
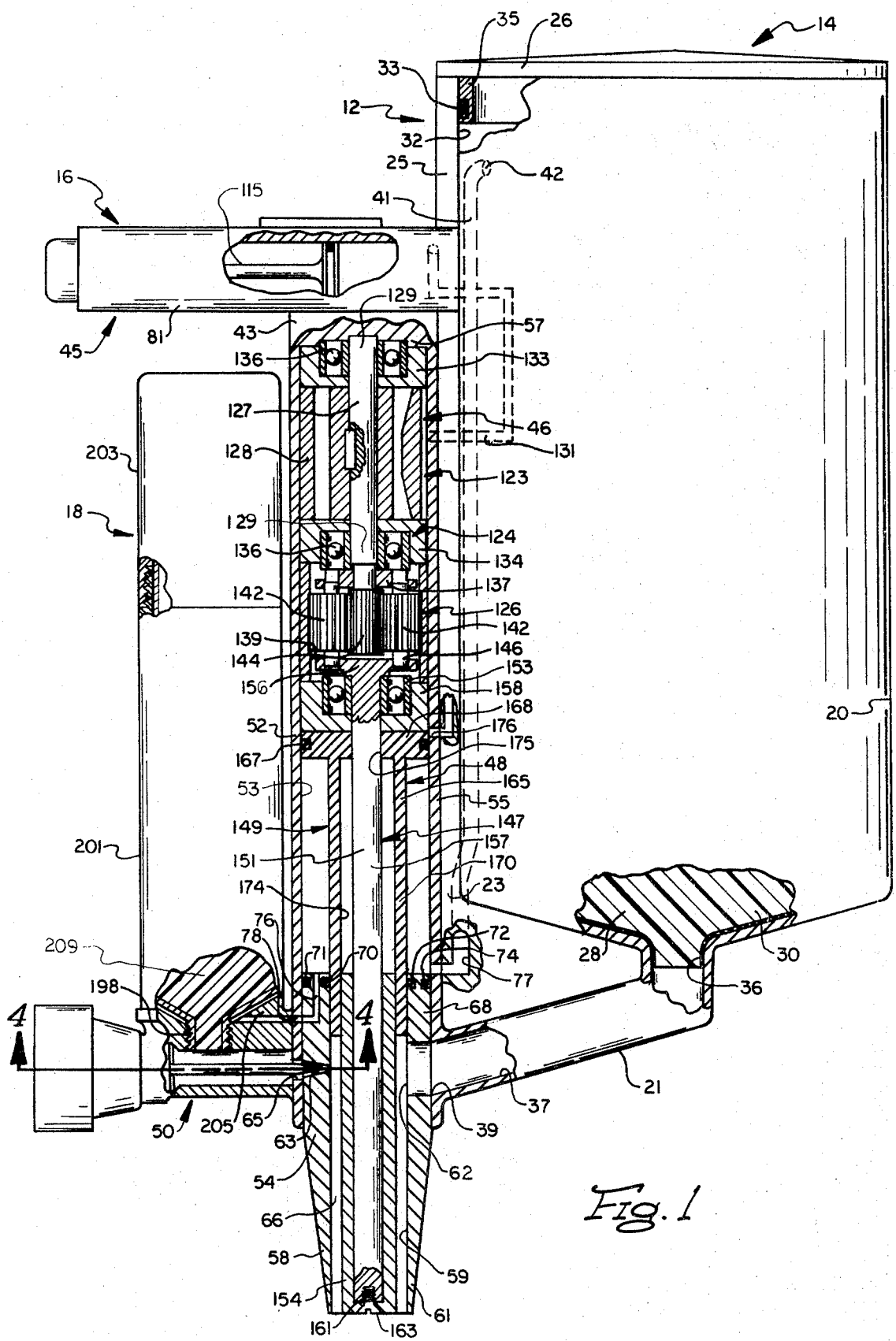
FIG. 1 is a side elevational view of the mixing and dispensing apparatus of this invention having portions thereof broken away for clarity.

The following is a discussion and description of preferred specific embodiments of the new mixing and dispensing apparatus of this invention, such being made with reference to the drawings, whereupon the same reference numerals are used to indicate the same or similar parts and/or structures. It is to be understood that such discussion and description is not to unduly limit the scope of the invention.

Referring to the drawings in detail and in particular to FIG. 1, the mixing and dispensing apparatus of this invention, indicated generally at 12, including a filler or first housing means 14 operably connected through a material control means 16 to a hardener or second housing means 18.

The filler housing means 14 includes a filler housing member 20 integral with a lower discharge throat 21 and having a fluid flow housing 23 connected thereto. More particularly, the filler housing member 20 resembles an inverted, jug type structure having a main body 25 with a lid member 26 mounted thereon. The main body 25 is provided with a central cavity indicated at 28 to receive filler material 30 therein packaged in a plastic bag or the like. The lid member 26 is mounted in an upper open end 32 of the main body 25 and secured thereto through clamp members (not shown) so as to provide an air seal therewith. An O-ring 33 is mounted within a downwardly depending lip section 35 of the lid member 26 to achieve the desired seal. The filler housing member 20 is provided with a lower discharge opening 36 integral with the discharge throat 21.

The discharge throat 21 is illustrated as a tubular type structure having a main fluid flow channel 37 therethrough having a lower opening 39 to receive filler material through the discharge throat 21 and fluid flow channel 37 to the material control means 16. The fluid flow housing 23 has a filler flow channel indicated at 41 therein which has an opening 42 into an upper portion of the filler housing member 20 to provide air pressure to move the filler material 30 therefrom. The filler flow channel 41 receives fluid pressure from the material control means 16 as will be explained.

The material control means 16 includes a main control housing 43 having connected thereto 1) an actuator control means 45; 2) a motor means 46; 3) a mixer and wiper means 48; and 4) a cleanser assembly 50. The control housing 43 includes a cylindrical main body 52 having a central bore 53 with a lower dispensing nozzle assembly 54 therein. The control housing 43 is secured and could be manufactured as an integral part of the filler housing member 20. The control housing 43 resembles an inverted tube member having sidewalls 55 closed at one end by a plate 57 and open at the lower end to receive the nozzle assembly 54 therein. The dispensing nozzle assembly 54 includes a main cylindrical nozzle member 58 having a central bore 59 and a tapered end section 61 for mixing and dispensing purposes. The nozzle member 58 includes a first opening 62 to be aligned with the lower opening 39 from the discharge throat 21 of the filler housing means 14 to direct filler material 30 to the central bore 59. The nozzle member 58 further includes a tapered opening 63 aligned with an opening 65 in the main body 52 to direct hardener material to the central bore 59 or mixing chamber 66. An upper portion 68 of the nozzle member 58 is provided with an inner and outer circular grooves 70 and 71 to receive O-rings 72 and 74, respectively, for fluid sealing purposes. Additionally, the upper portion 68 is provided with a supply channel 76 therethrough aligned with an opening 78 in the control housing 43 providing fluid pressure to the hardener hosuing means 18. Fluid pressure is received from a channel 77 in the control housing 43.

Figure 3:
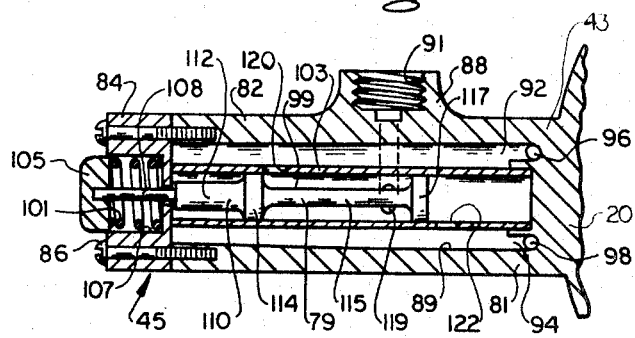
FIG. 3 is a fragmentary sectional view illustrating an actuator control means of the mixing and dispensing apparatus of this invention.

As shown in FIG. 3, the actuator control means 45 includes a plunger assembly 79 mounted within a main plunger housing 81 which, in turn, is connected to or integrally formed with the control housing 43 and the filler housing member 20. The plunger housing 81 includes a housing member 82 having a cap member 84 mounted upon one end by a pair of screw members 86 and having an inlet conduit section 88. The housing member 82 is provided with a main central opening or bore 89 sealed by the cap member 84. The inlet conduit section 88 is adapted to receive a fluid supply to transfer pressure fluid to the plunger assembly 79 through a supply channel 91. Also, connected through holes 92 and 94 in the plunger housing 81 are first and second fluid flow channels 96 and 98, respectively.

The plunger assembly 79 includes a main actuator plunger 99; a spring member 101 mounted between the cap member 84 and the actuator plunger 99; and a guide sleeve 103 having the actuator plunger 99 therein. The actuator plunger 99 is provided with a head or button section 105 mounted within a cylindrical opening 107 in the cap member 84 and connected by a shaft section 108 to a main body section 110. The spring member 101 is mounted in the cylindrical opening 107. The main body section 110 includes a first section 112 connected by a first shoulder 114 to a second section 115 having a second shoulder 117. The guide sleeve 103 is adapted to sealingly receive the first and second shoulders 114 and 117 so as to control the movement of fluid from the inlet conduit section 88 and opening 119 into the guide sleeve 103 and selectively to the first and second fluid flow channels 96 and 98. The guide sleeve 103 is provided with spaced first and second holes 120 and 122 to direct fluid to the first and second fluid flow channels 96 and 98. In the position of FIG. 3, it is obvious that fluid from the inlet conduit section 88 will flow through the opening 119 and first hole 120 to the first fluid flow channel 96. On axial movement of the actuator plunger 99, it is obvious that the first and second shoulders 114 and 117 would allow fluid flow from the inlet conduit section 88, opening 119, second hole 122, and into the second fluid flow channel 98.

As shown in FIG. 1, the motor means 46 includes a main air rotor assembly 123 operably connected to a bearing assembly 124 and a gear assembly 126. The air rotor assembly 123 includes a plurality of fan or blade members 128 secured to a central driven shaft 127 which has end sections 129 extended outwardly from the blade members 128. The blade members 128 are operably connected to the second fluid flow channel 98 through conduit 131 for operation under fluid pressure.

The bearing assembly 124 includes bearing mount members 133 and 134 in contact with the inner surface of the control housing 43 having bearing members 136 mounted therewithin to support respective ones of the end sections 129. The lower end of the central driven shaft 127 has a connector section 137 which is connected to the gear assembly 126.

The gear assembly 126 includes a 1) main gear 139 connected to the inner surface of the control housing 43; 2) a pair of planetary gears 142 having outer teeth in contact with teeth of the main gear 139; and 3) a driven gear 144 secured to the central driven shaft 127. It is noted that the gear assembly 126 acts as a planetary gear system with the planetary gears 142 having lugs or shafts 146 which are connected to the mixer and wiper means 48. The combination of the main gear 139, the planetary gears 142, and the driven gear 144 is operable to provide rotation to the mixer and wiper means 48 with the gears being of a predetermined size to achieve the desired rotational speed of the air rotor assembly 123 and resultant mixing action.

The mixer and wiper means 48 includes a mixer assembly 147 connected to the motor means 46 and a wiper assembly 149 mounted about the mixer assembly 147 and movable within the central bore 59 of the nozzle assembly 54. The mixer assembly 147 includes a main elongated mixer shaft 151 mounted within a bearing assembly 153 and having a mixer blade 154 connected thereto.

The mixer shaft 151 includes a head section 156 integral with an elongated cylindrical shaft 157. The head section 156 is connected to lower shaft sections 146 of the planetary gears 142. The cylindrical shaft 157 is mounted in the bearing assembly 153 which is held against movement in a mounting block 158. The cylindrical shaft 157 is provided with an internally threaded hole 161 at the lower end to receive a screw member 163 to anchor the mixer blade 154 thereon. This is desirable so as to permit replacement of the mixer blade 154 whenever required or desired due to wear or maintenance thereon.

Figure 5:
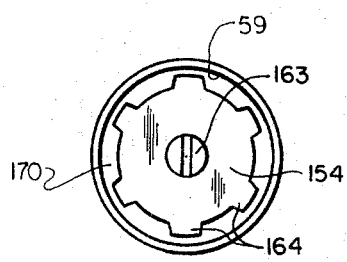
FIG. 5 is a bottom plan view of a dispensing nozzle assembly of the control housing of the mixing and dispensing apparatus of this invention.

As shown in FIG. 5, the mixer blade 154 is provided with an irregular outer peripheral surface and, in this case, having six (6) outer mixing protrusions indicated at 164 to arrive at the desired turbulence in the mixing chamber 66.

The wiper assembly 149 includes a main wiper member 165 having an O-ring 167 thereabout for sealing purposes on engagment with the cylindrical bore 53 of the control housing 43. The wiper member 165 is provided with a main head portion 168 integral with an elongated shaft portion 170. The O-ring 167 is mounted within a groove in the head portion 168. The shaft portion 170 is provided with a central, elongated bore 174 formed of an irregular shape so as to conform with the outer peripheral surface of the mixer blade 154. As shown in FIG. 5, the outer surface of the shaft portion 170 is of a cylindrical shape so as to be engagable in a wiping action both with the inner surface of the central bore 59 of the nozzle assembly 54 and the outer periphery of the mixer blade 154. The head portion 168 is provided with a central hole 175 to receive the mixer shaft 151 therethrough and rotates therewith but is movable axially relative to the mixer shaft 151. The wiper assembly 149 is movable axially on application of fluid pressure through a hole 176 connected to the first fluid flow channel 96.

Figure 4:
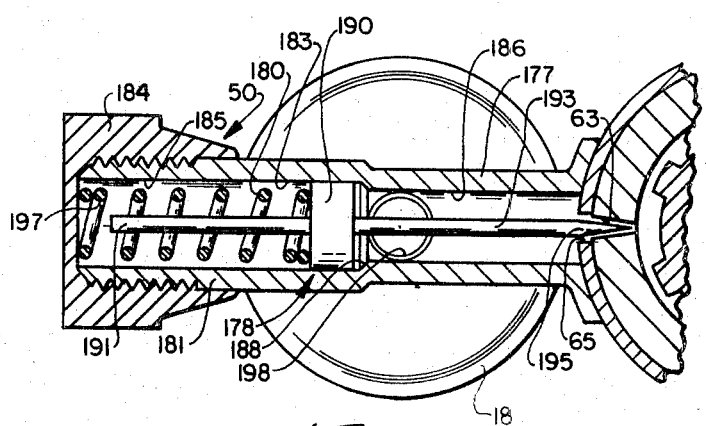
FIG. 4 is an enlarged fragmentary sectional view taken along line 4—4 in FIG. 1.

As shown in FIG. 4, the cleanser assembly 50 includes a main cleanser housing 177 which may be an integral part of the control housing 43; a needle assembly 178 mounted within the cleanser housing 177; and a biasing means 180 operably connected to the cleanser housing 177 and the needle assembly 178. The cleanser housing 177 includes a main body 181 having a main bore 183 therethrough and with a closure or adjustment cap 184 secured at one end thereof. The main bore 183 is formed with a first stepped portion 185 and a second stepped portion 186 separated by a shoulder portion 188 for reasons to become obvious.

The main bore 183 is centrally positioned about the opening 65 in the control housing 43 and the tapered opening 63 in the nozzle member 58. The outer end of the main body 181 has external threads to receive the adjustment cap 184 thereon.

The needle assembly 178 includes a plug member 190 having a first shaft section 191 on one side and a needle shaft section 193 extended from the opposite side of the plug member 190. The plug member 190 is mounted in the first stepped portion 185 and slidably movable therein. The needle shaft section 193 has a tapered end portion 195 so as to fit within the tapered opening 63 in the nozzle member 58. It is seen that the length of the needle shaft section 193 is predetermined so as to provide the desired wiping and sealing action without engagement with the wiper member 165 when in the closed condition of FIG. 2.

The biasing means 180 is a compression spring member 197 mounted within the main bore 183 having one end against the plug member 190 and the opposite end against the adjustment cap 184. It is seen that the biasing force of the spring member 197 and size of discharge opening to the mixing chamber 66 can be regulated by movement of the adjustment cap 184. The cleanser housing 177 is further provided with an internally threaded opening 198 which is integral with the hardener housing means 18.

The hardener housing means 18 includes a first main body section 201 having external threads thereon with a closure cap member 203 connected thereto. The closure cap member 203 connected thereto. The closure cap member 203 and the body section 201 form a hardener material cavity. The hardener body section 201 includes a lower tapered end section 205 open to the threaded opening 198 of the cleanser housing 177. The tapered end section 205 has a fluid flow channel which is aligned with the flow openings 76 and 78 in the nozzle member 58 to receive fluid pressure within the hardener housing means 18 from the second fluid flow channel 98. The closure cap member 203 is adapted to be removed so that a tube of hardener material having external threads can be mounted within the threaded opening 198 of the cleanser housing 177 in sealing engagement. Then the closure cap member 203 is threadably placed thereon whereupon fluid pressure from the second fluid flow channel 98 would act to force a hardener material 209 therefrom into the cleanser assembly 50 for movement into the mixing chamber as will be described.

Figure 2:
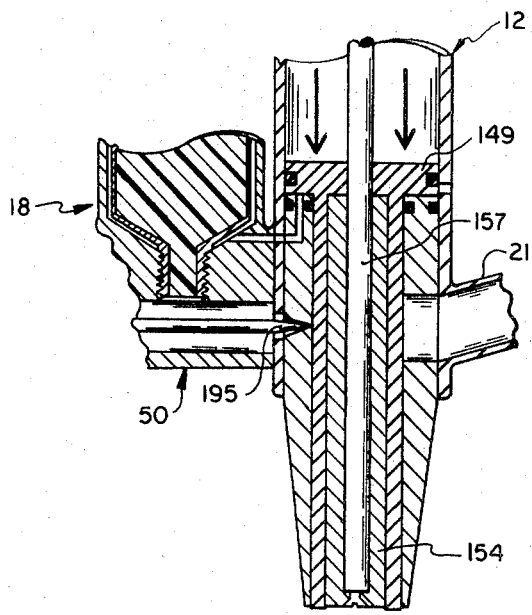
FIG. 2 is a fragmentary sectional view of a portion of a material control means of the mixing and dispensing apparatus of this invention.

In the use and operation of the mixing and dispensing apparatus 12 of this invention, it is noted that the filler housing means 14 is first provided with the filler material 30 which can be placed therein in preferably a plastic bag so that the fluid pressure collapses the plastic bag and moves the filler material 30 downwardly for discharge through the discharge throat 21 into the mixing chamber area 66. The lid member 26 is secured to the filler housing 20 in a sealing manner. Next, the hardener or second housing means 18 has its closure cap member 203 removed whereupon a tube of hardener material 209 can be placed therein and sealed within the threads 198 of the cleanser housing 177. The closure cap member 203 is replaced and seals the hardener housing means 18 against air leakage. Next, a fluid supply, such as air, is connected to the inlet conduit section 88 so that air pressure is in the normal non-usage condition of FIG. 3, supplied through supply channel 91 to the inside of the guide sleeve 103. The fluid pressure then flows through the opening 121 in the guide sleeve 103 into the first fluid flow channel 96. In this condition, the first fluid flow channel 96 is shown as applying the fluid pressure adjacent the mounting block 158 of the bearing assembly 153 against the head portion 168 of the wiper member 165 through hole 176. In this condition, the fluid pressure acts to move the wiper member 165 downwardly to the condition as shown in FIG. 2 which is in the closed or sealed condition when material is not being dispensed. Also, in this condition, no fluid pressure is being applied to the filler housing means 14 or the hardener housing means 18 whereby the cleanser assembly 50 and, more particularly, the needle shaft section 193 is moved forward by the compression spring member 197 so as to cleanse and seal the openings 63 and 65 into the mixing chamber 66 to prevent drying of the hardener material.

On desiring a dispensing operation of the materials contained within the first and second housing means 14 and 18, it is noted that one depresses the actuator plunger 99 by pushing the button section 105 inwardly from the position as shown in FIG. 3. On inward movement of the first and second shoulders 114 and 117, it is obvious that fluid pressure within the guide sleeve 103 thereupon moves through the hole 122 into the second fluid flow channel 98. This then applies the fluid pressure 1) through the opening 42 to the top portion of the first housing means 14 to force filler material 30 therefrom; 2) through the channel 77 to the lower side of the head portion 168 of the wiper member 165 to move the same upwardly to the condition as shown in FIG. 1; 3) through the conduit 131 to drive the motor means 46; and 4) through channel 76 to the second housing means 18. It is noted that this fluid pressure thereupon acts against the hardener material 209 to move into the cleanser housing 177 against the spring member 197 to move the needle shaft section 193 outwardly to allow hardener material 209 to be moved through the conical opening 63 into the mixing chamber 66. It is noted that the discharge of hardener material 209 can be regulated by rotation of the adjustment cap 184 to get the desired mixed ratios. It is obvious that, as long as the plunger button section 105 is depressed, the mixing operation will continue with the fluid pressure against the motor means 46 operating through the gear assembly 126 to rotate the mixer shaft 151 and mixer blade 154.

As shown in FIG. 5, it is seen that the spacing of the protrustions 164 from the central bore 59 of the nozzle assembly 54 in the mixing chamber 66 will operate to quickly and thoroughly agitate the filler and hardener material into a homogeneous mixture. It is obvious that this mixing and dispensing continues as long as the plunger button section 105 is depressed. On desire to cease the mixing and dispensing operation, one only need to release the plunger button section 105 whereupon the fluid pressure is applied to the first fluid flow chamber 96 to move the wiper member 165 axially and downwardly so as to remove any material in the mixing chamber 66 and wipe off the mixer blade 154. The wiper member 165 forms a sealing engagement with the central bore 59 to prevent air from entering and drying out the filler and hardener material.

Figure 6:
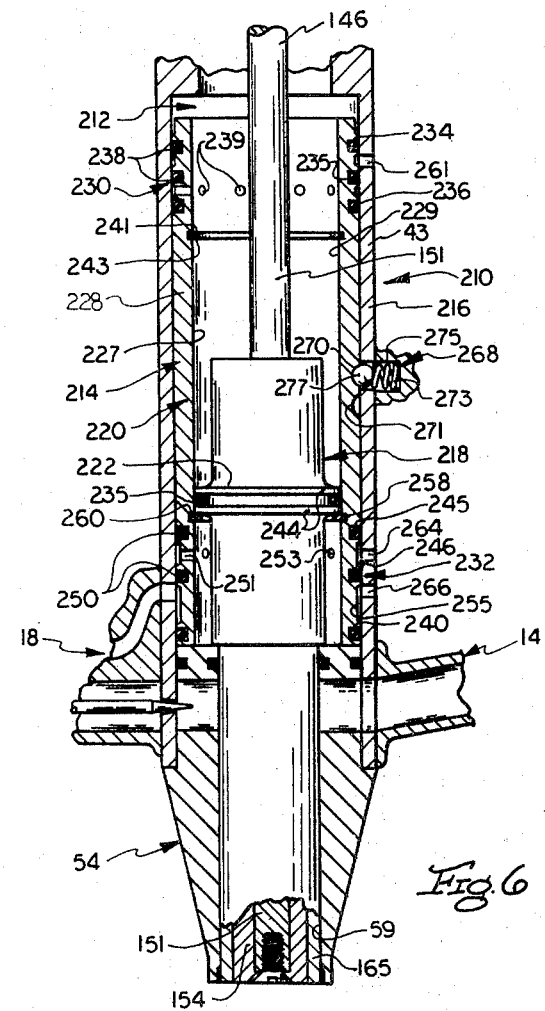
FIG. 6 is a fragmentary, sectional view of a second embodiment of the mixing and dispensing apparatus of this invention.

In a second embodiment as shown in FIG. 6, a mixing and dispensing apparatus 210 includes the filler or first housing means 14 connected through a material control means 212 to the hardener or second housing means 18. The first and second housing means 14, 18 are as described in the first embodiment.

The material control means 212 includes the main control housing 43 having connected thereto 1) the actuator control means 45; 2) the motor means 46; 3) a mixer and wiper means 214; and 4) the cleanser assembly 50.

In this embodiment of the mixer and wiper means 214, the mixer assembly 147 is connected to the motor means 46 and to a wiper assembly 216 which, in turn, is mounted about the mixer assembly 147 and movable within the central bore 59 of the nozzle assembly 54. The mixer assembly 147 includes the mixer shaft 151 having the mixer blade 154 connected thereto.

The wiper assembly 216 includes the wiper member 165 secured at an upper end to a control head 218, both of which are slidably mounted in a fluid control sleeve assembly 220. The wiper member 165 is mounted about the mixer shaft 151 and axially movable in the central bore 59.

The control head 218 is of a cylindrical shape and is mounted about the mixer shaft 151 for axial movement and includes a central seal assembly 222. The seal assembly 222 includes a pair of parallel ridges 224 defining a circumferential groove having an O-ring 225 therein sealing with an inner surface 227 of the fluid control sleeve assembly 220.

The fluid control sleeve assembly 220 is of a cylindrical tube 228 with a central bore 229 having an upper control assembly 230 and a lower control assembly 232. The upper control assembly 230 includes three, spaced parallel grooves 234, 235, and 236, each having an O-ring member 238 therein; a plurality of holes 239 into the central bore 229 between the grooves 235 and 236; and an inner groove 241 below the groove 236 having a retaining ring 243 therein.

The lower control assembly 232 includes grooves 245, 246, and 248, each having an O-ring 250 therein; an outer peripheral groove 251 in the tube 228 with holes 253 into the central bore 229; an extended peripheral cutout 255 between the grooves 246 and 248; and an inner groove 258 above the groove 245 having a retaining ring 260 therein.

As shown in the inactive condition of FIG. 6, the control housing 43 has an inlet channel 261 to provide air pressure to the top side of the control head 218 for downward movement. An air inlet channel 264 is operable to provide air pressure through the groove 251 and holes 253 to the lower side of the control head 218 for axial movement as will be described. Further, an air outlet opening 266 leading to the motor means 46 leads into the cutout 255. The control housing 43 also includes a detent assembly 268 selectively connected to upper and lower semi-circular openings 270, 271 in the fluid control sleeve assembly 220.

The detent assembly 268 includes a compression spring 273 mounted in a hole 275 and operable to bias a ball member 277 into respective ones of the semi-circular openings 270, 271.

Figure 7:
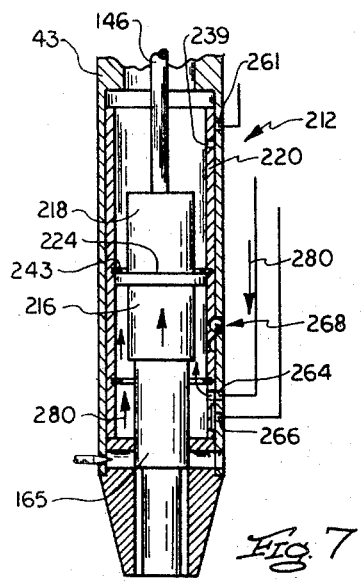
FIGS. 7, 8, and 9 are sectional schematic views illustrating the operation of the mixing and dispensing apparatus as shown in FIG. 6.

In the use and operation of the mixer and wiper means 214 as shown in FIGS. 6-9, inclusive, fluid pressure is provided in inlet channel 261 but causes no action as sealed by the O-ring members 238 in the grooves 234 and 235. On depression of the actuator control means 45 and actuator plunger 99, fluid pressure is applied through air inlet channel 264, groove 251, and holes 253 as shown by arrows 280 to move the wiper assembly 216 upwardly as shown in FIG. 7. The upper one of the ridges 224 contacts the retaining ring 243 to move the entire fluid control sleeve assembly 220 upwardly to the position of FIG. 8.

Figure 8:
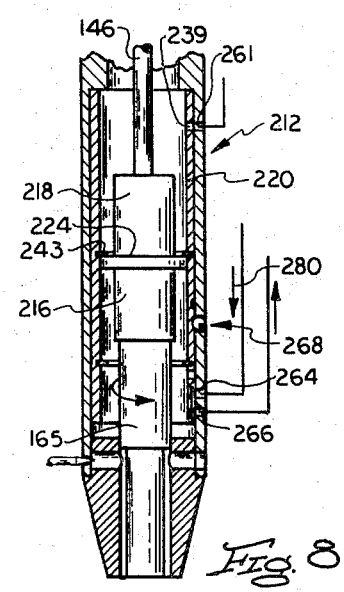

In the condition of FIG. 8 with depression of the actuator plunger 99, fluid pressure is applied through the inlet channel 264, peripheral cutout 255, and air outlet opening 266 to drive the motor means 46. In this position, the inlet channel 261 is aligned with the holes 239 to provide access to the central bore 229.

Figure 9:
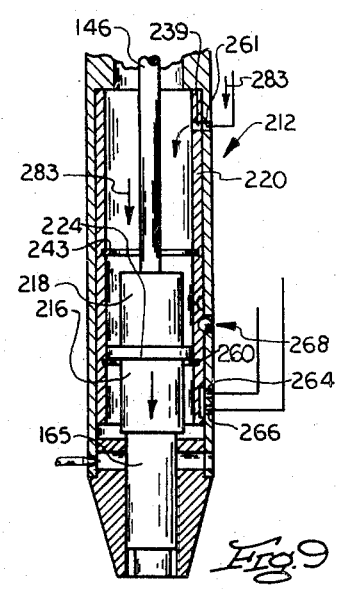

On release of the actuator plunger 99, fluid pressure is applied as shown by arrows 283 to the upper side of the wiper assembly 216 for downward movement as shown in FIG. 9. The lower one of the ridges 224 contacts the retaining ring 260 as shown in FIG. 9 and further moves the fluid control sleeve assembly 220 to the inactive position of FIG. 6 thus being in position for another cycle of operation.

It has been found in the construction of the wiper assembly and the mixer assembly that the use of teflon and plastic materials provide the utmost construction as far as reliability in wiping, mixing, and cleansing operations. This is especially important in this invention as the combination of the filler and the hardener materials to form an epoxy mixture is critical as, after the mixing of the materials, the hardening process quickly results in a very solidified structure which is difficult to remove from any surface after the hardening process.

The mixing and dispensing apparatus of this invention overcomes the objections to the prior art structures providing an automatic mixing and dispensing operation of critical mixing materials in a most effective and efficient manner with automatic cleansing of the mixing chamber. This is particularly important due to the type of materials involved herein that a cleansing operation be reliable and durable for repeat operation.

The mixing and dispensing apparatus of this invention can be constructed of a plastic type material having its molded air flow channels therein so as to be economical to manufacture; simple to use; reliable in operation; and substantially maintenance free.

While the invention has been described in conjunction with preferred specific embodiments thereof, it is to be understood that this description is intended to illustrate and not to limit the scope of the invention, which is defined by the following claims.

I claim:

1. A mixing and dispensing apparatus adapted to hold, mix, and dispense first and second materials therefrom, comprising:
   a. a first housing means having a first material therein,
   b. a second housing means having a second material therein,
   c. a material control means having a mixing chamber operably connected to said first housing means and said second housing means to receive the first and second materials therein for mixing purposes,
   d. said material control means having an actuation control means connected to said first housing means and said second housing means to selectively force the first and second materials into said mixing chamber, and;
   e. said material control means including a control housing having a mixer and wiper means therein extended within said mixing chamber, said actuator control means operably connected to said mixer and wiper means; operable under one set of conditions to force the first and second materials into said mixing chamber for thorough agitation into a mixed material combination and operable under a second set of conditions to cease movement of the first and second materials and to seal said mixing chamber from air and to remove therefrom the mixed material combination.

2. A mixing and dispensing apparatus as described in claim 1, wherein:
   a. said control means having said actuator control means connected to a fluid power source operable under said one set of conditions to continuously dispense the first and second materials to said mixing chamber and rotate said mixer and wiper means.

3. A mixing and dispensing apparatus as described in claim 2, wherein:
   a. said control means having a motor means connected to said actuator control means to receive said pressure source for operation thereof, and
   b. said motor means connected to said mixer and wiper means to rotate same under said one set of conditions.

4. A mixing and dispensing apparatus as described in claim 3, wherein:
   a. said mixer and wiper means having a mixer assembly connected to said motor means and a wiper assembly connected to said mixer assembly, and
   b. said mixer assembly having a mixer blade with outwardly extended protrusions to agitate the first and second materials in said mixing chamber.

5. A mixing and dispensing apparatus as described in claim 4, wherein:
   a. said wiper assembly having a wiper member mounted about said mixer blade having an inner contour conforming to the external contour of said mixer blade, and
   b. said wiper member having a peripheral shape conforming and engagable with a central bore of said mixing chamber to completely fill up the area between said mixer blade and said mixing chamber when under said second set of conditions.

6. A mixing and dispensing apparatus as described in claim 5, wherein:
   a. said wiper member is rotatable with and axially movable relative to said blade member, and
   b. under said one set of conditions, said actuator control means biases said wiper member through said mixing chamber to remove all materials therefrom.

7. A mixing and dispensing apparatus as described in claim 2, wherein:
   a. said control means having a cleanser assembly connected to said second housing means and said mixing chamber,
   b. said cleanser assembly having a closure housing and a closure member mounted with a flow channel in said closure housing from said second housing means to said mixing chamber, and
   c. said closure member operable under said first set of conditions to open said flow channel to move the first material to the mixing chamber and operable under said second set of conditions to close and seal said flow channel to prevent hardening of the second material.

8. A mixing and dispensing apparatus as described in claim 7, wherein:
   a. said closure housing having an adjustment cap thereon movable to adjust the opening into said mixing chamber from said flow channel to regulate amount of hardener material being dispensed.

9. A mixing and dispensing apparatus as described in claim 1, wherein:
   a. said mixer and wiper means having a mixer assembly connected to said motor means and a wiper assembly connected to said mixer assembly,
   b. said wiper assembly having a wiper member movable within a fluid control sleeve under said one set of conditions and said second set of conditions; and
   c. said wiper member movable to a retracted condition prior to operation of said mixing chamber for mixing of the first and second materials.

10. A mixing and dispensing apparatus as described in claim 9, wherein:
    a. said wiper member on cessation of operation of said mixing chamber automatically moved to the extended, inactive condition to seal and clear said mixing chamber of the mixed material therein.

11. A mixing and dispensing apparatus as described in claim 9, wherein:
    a. said control sleeve of a tubular shape slidably movable within said control housing to selectively provide fluid pressure to said wiper member for axial movement of said control sleeve and said wiper member.

12. A mixing and dispensing apparatus as described in claim 11, wherein:
    a. said control sleeve having a pair of spaced retaining rings selectively engagable with said wiper member to achieve conjoint movement therewith from the active to inactive conditions.

* * * * *